Sept. 8, 1964 TATSUNOSUKE SAKAMOTO ETAL 3,147,689
AUTOMATIC ELECTRIC EGG COOKER
Filed May 14, 1962 8 Sheets-Sheet 3

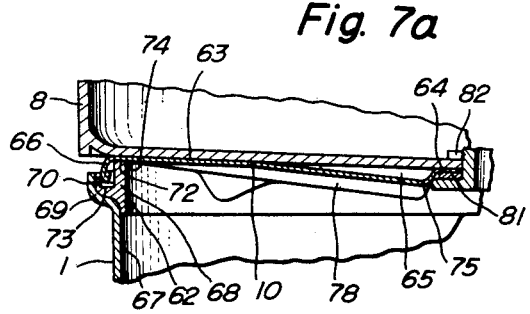
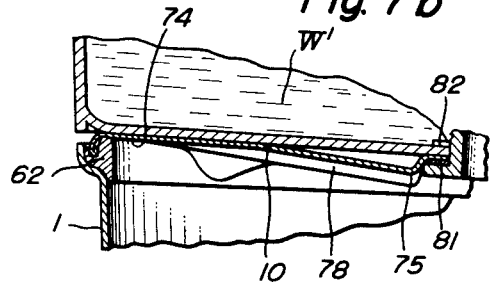
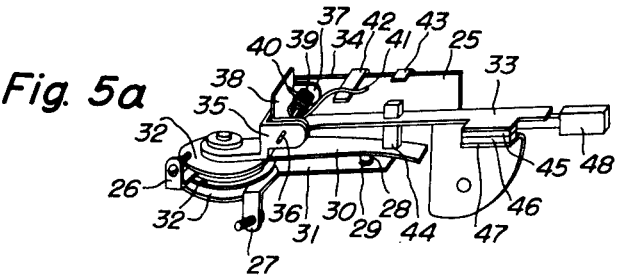
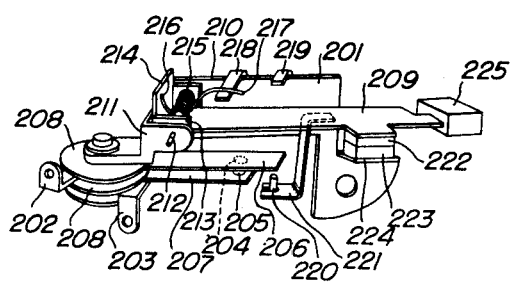

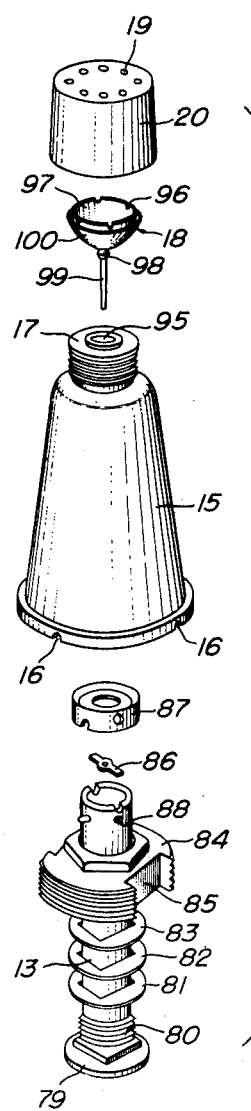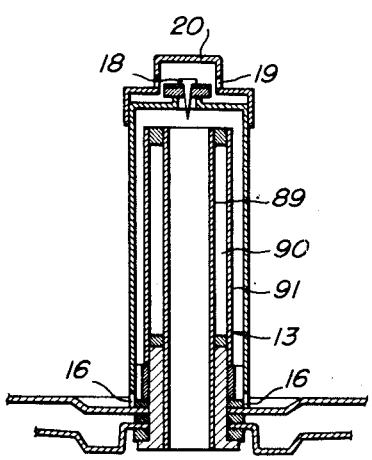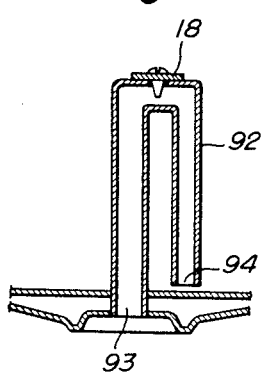

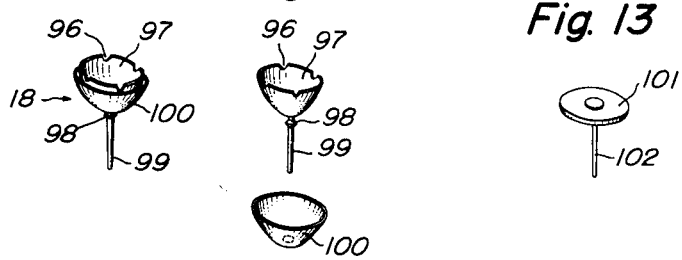
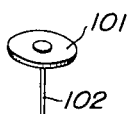
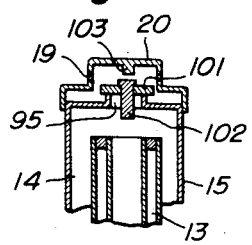
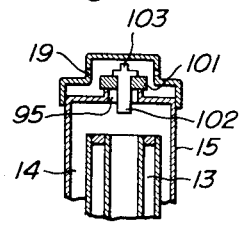
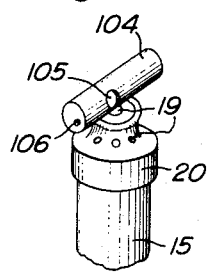
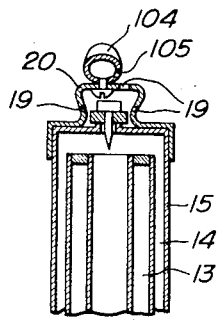

Sept. 8, 1964  TATSUNOSUKE SAKAMOTO ETAL  3,147,689
AUTOMATIC ELECTRIC EGG COOKER Filed May 14, 1962  8 Sheets-Sheet 7

United States Patent Office 3,147,689
Patented Sept. 8, 1964

3,147,689
AUTOMATIC ELECTRIC EGG COOKER
Tatsunosuke Sakamoto, Minoo-shi, Shojiro Inoue, Toyonaka-shi, Yoshiaki Sano, Kobe, and Satoshi Nakahara, Osaka, Japan, assignors to Matsushita Electric Industrial Co., Ltd., a corporation of Japan
Filed May 14, 1962, Ser. No. 195,041
Claims priority, application Japan May 15, 1961, 36/17,-379; May 22, 1961, 36/25,511; May 25, 1961, 36/26,-378, 36/26,379, 36/26,380, 36/26,381, 36/26,382, 36/26,383; May 26, 1961, 36/26,542; May 29, 1961, 36/26,928, 36/26,929; May 31, 1961, 36/27,850, 36/27,851, 36/27,852, 36/27,853, 36/27,854; June 6, 1961, 36/28,836, 36/28,837, 36/28,838, 36/28,839, 36/28,-840, 36/28,841, 36/28,842, 36/28,843, 36/28,844, 36/28,845, 36/28,846, 36/28,847, 36/28,848; June 9, 1961, 36/29,740, 36/29,741; Mar. 7, 1962, 37/11,468; Mar. 8, 1962, 37/11,561, 37/11,562, 37/11,563; Mar. 13, 1962, 37/10,068
4 Claims. (Cl. 99—331)

The present invention relates to an improved automatic electric egg cooker and is designed to obtain eggs cooked or boiled to any desired hardness by arranging so that the heating of eggs is automatically interrupted when they have been cooked to the desired hardness in a manner so as to automatically stop the progress of coagulation of the egg content due to continued heating of the cooked eggs.

To obtain cooked eggs of a desired hardness, it has previously been necessary either to take the cooked eggs out of the heating pot and put them into cold water or manually to pour cold water into the heating pot when the eggs have been cooked to the desired degree.

According to the present invention, the egg heating is automatically interrupted when the eggs have been cooked to any desired hardness and the eggs thus cooked is then automatically cooled with cold water to preclude any continued heating and hence coagulation of the egg content thereby assuring that the eggs are cooked to the desired hardness.

These and other objects and advantages of the present invention will be apparent from the following description when read in injunction with the accompanying drawings, in which:

FIG. 3b is a cross-sectional elevation of the packing shown in FIG. 3a;

FIGS. 5a and 5b illustrate in perspective two forms of thermostatic switch adapted to be fitted to the automatic electric egg cooker of the invention;

FIGS. 7a and 7b are a fragmentary cross section of the packing element of the automatic electric egg cooker of the invention with no cold water filled in the water tank and with cold water held therein, respectively;

FIG. 9 is an exploded perspective view of one form of water-sucking device for use in the automatic electric egg cooker of the present invention;

FIG. 10 is a cross-sectional side elevation of another form of water-sucking device;

FIG. 11 is a cross-sectional side elevation of an extremely simplified form of water-sucking device;

FIG. 12a is a perspective view of one form of check valve used in the steam-ejecting device;

FIG. 12b is an exploded perspective view of the check valve shown in FIG. 12a;

FIG. 13 is a perspective view of an extremely simplified form of check valve;

FIGS. 14 and 15 are a fragmentary cross-sectional side elevation of respective forms of means for limiting the range of travel of the check valve for the purpose of preventing it from being dislocated from its normal position;

FIGS. 16a and 16b illustrate in perspective and in cross-sectional side elevation, respectively, one form of means for sensing the degree of cooking as set;

FIG. 17b is a cross-sectional side elevation taken along the line 17—17 in FIG. 17a;

Figure 1:
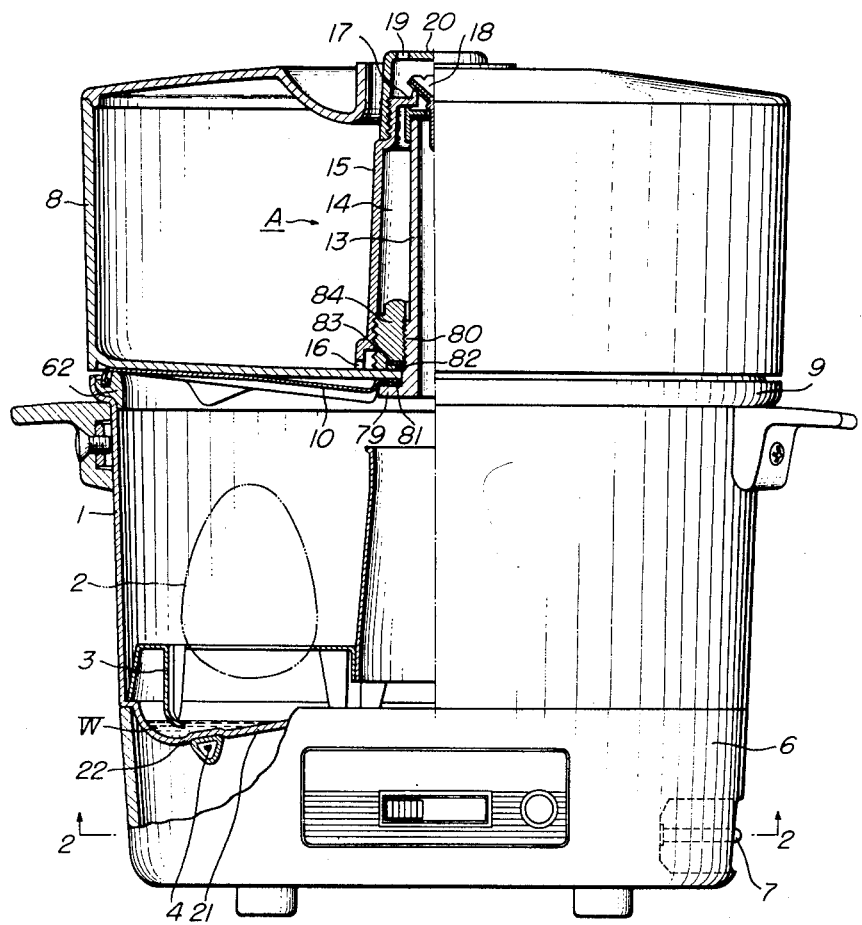
FIG. 1 is a side elevation partly in section of an automatic electric egg cooker embodying the present invention.
Figure 2:
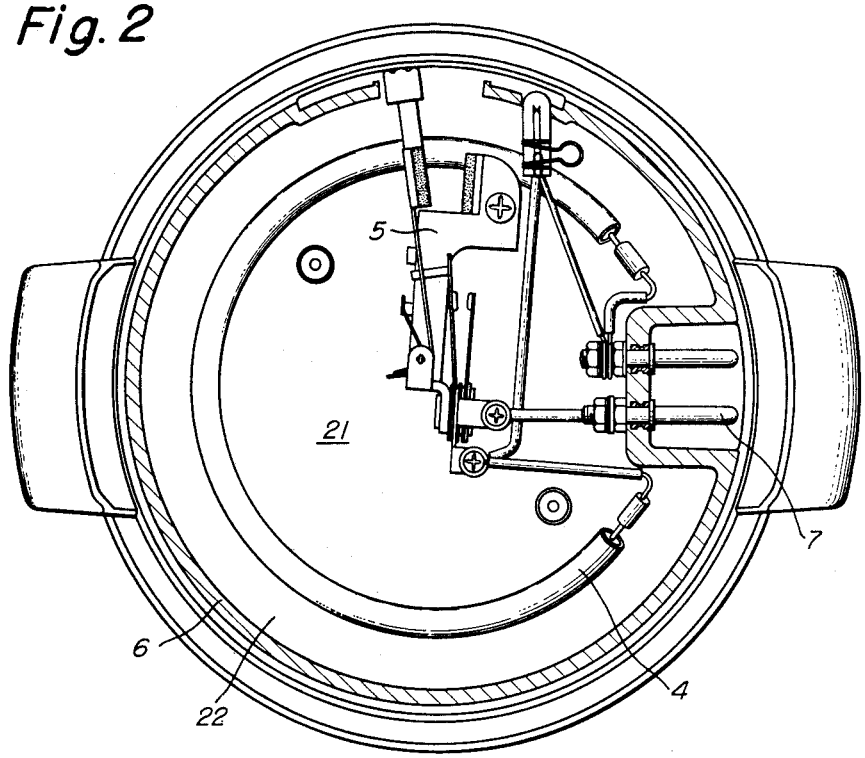
FIG. 2 is a cross section taken along the line 2—2 in FIG. 1 and showing the details of the bottom construction of the boiling pot.

In conventional forms of automatic electric egg cooker, heating water in an amount as required to boil a number of eggs to a desired hardness is put into a boiling pot and an egg-supporting structure with the eggs thereon is placed therein. The boiling pot is then closed with a cover therefor. A heater fitted on the outer bottom surface of the boiling pot is subsequently energized to evaporate the heating water therein to heat the eggs. As the heating and hence evaporation of the heating water proceed, the latter is vaporized until no heating water remains in the pot. The pot temperature is rapidly raised thereafter. A thermostatic switch is mounted adjacent to the heater which is adapted to break the heater circuit when a predetermined temperature is reached and not to reclose the circuit unless actuated by an external force. The thermostatic switch operates upon rapid temperature rise of the pot to interrupt the energization of the heater and the heating of the eggs.

With such conventional form of automatic electric egg cooker, if the eggs cooked are left continually in the boiling pot after the actuation of the thermostatic switch but not be taken out immediately thereafter, the eggs would be cooked to a hardness higher than desired because of the coagulation of the egg content continuing even after the actuation of the thermostat due to the heat stored in the eggs themselves, the thermal inertia of the heater and the boiling pot, the heat content of the vapor surrounding the eggs and other different heat accumulations.

For instance, when half-boiled eggs are desired, even if a proper amount of heating water is filled for obtaining such half-boiled eggs, the eggs obtained will have an undesirably high hardness due to continued coagulation of the egg content by the different heat accumulation effects, if the eggs are left in the pot after the thermostatic switch has been actuated. Similarly, when the egg cooker is set for hard-boiled eggs, the eggs obtained will be subject to continued heating due to the different heat accumulation effects even after the actuation of the thermostatic switch if the eggs are left in the boiling pot. As a result, the egg white comes to produce hydrogen sulfide, which coming in contact with egg yolk gives to the surface thereof a dark green color while emitting an offensive odor. This is undesirable diminishing the appetite of persons served.

It has thus been difficult with conventional forms of automatic electric egg cooker to obtain eggs cooked to a desired cooking degree.

Therefore, to obtain boiled eggs of a desired hardness with such conventional automatic electric egg cooker, it has been necessary either to take the eggs boiled out of the pot or to pour cooling water into the pot immediately after the heating element has been deenergized. For the purpose, the user is required to watch the operation of the cooker so that he may perform the egg cooling procedure immediately upon the termination of the heater operation, which means that the conventional cooker is inconvenient to use requiring continued attendance for its proper operation.

Eggs when heated generally follow the process of coagulation as follows. The egg white starts to coagulate at about 60 degrees centigrade and as the temperature continues to rise the egg white grows jellylike and finally completes coagulation at about 80 degrees centigrade. The egg yolk starts to get dense at about 65 degrees centigrade to complete coagulation at about 70 degrees centigrade.

Accordingly, conventional forms of automatic electric egg cooker have been designed to employ water for heating eggs loaded therein while controlling the amount of heat transmitted to eggs and the length of heating time so as to obtain eggs cooked to the desired hardness. However, once the eggs have been cooked and the thermostatic switch has been actuated, the eggs cooked may not be left in the boiling pot any longer because of different heat accumulation effects involved.

In view of the foregoing difficulties of conventional automatic electric egg cookers, the present invention is designed to eliminate different heat accumulation effects after the actuation of a thermostatic switch or a timing switch to prevent any further progress of coagulation of the egg white and yolk thereby to obtain without fail eggs of the desired hardness with accuracy.

Referring to the drawings, numeral 1 designates a bottomed cylindrical boiling pot formed of sheet metal having a relatively low heat capacity. In the boiling pot 1 are contained heating water W and an egg supporting assembly 3 with eggs 2 placed thereon.

Figure 3A:
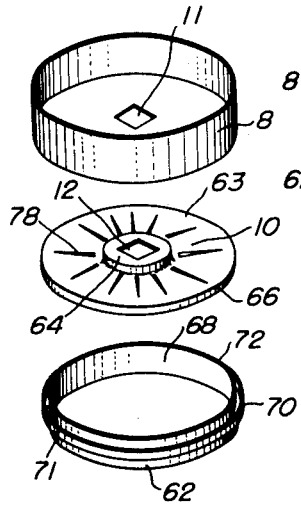
FIG. 3a is an exploded perspective view of the tank assembly including a water tank, heat insulating plate and a packing.

A heater element 4 and a thermostatic switch 5 are mounted on the outer surface of the bottom of the boiling pot 1 and covered by a skirt 6 enclosing the bottom portion of the boiling pot 1 with a plug socket 7 fitted in a portion of the skirt 6. A water tank 8 is mounted on the boiling pot 9 above the top opening 9 thereof with a heat shielding plate 10 interposed therebetween. The water tank 8 is preferably molded of a plastic not subject to any deformation at temperatures up to 100° C. Square through apertures 11 and 12 are respectively formed in the bottom of the water tank 8 and the heat shielding plate 10 as seen in FIG. 3a to receive a water-sucking device generally indicated at A. Briefly describing the construction of the water-sucking device A, it includes a suction pipe 13 fitted water-tight through said through apertures 11 and 12, and a tubular guide 15 surrounding suction pipe 15 with a space 14 defined therebetween and having suction ports 16 formed at the bottom as shown. A check valve 18 is provided on the top 17 of the tubular guide 15. A cap member 20 is fitted to the top of the tubular guide 15 so as to enclose said check valve 18 and has formed therein a number of steam orifices 19. The water-sucking device A constructed as described above is mounted in the water tank 8 as shown.

In operation of the automatic electric egg cooker constructed as described above, firstly the egg supporting structure 3 with eggs 2 thereon is placed in position in the boiling pot 1 and a proper amount of heating water W is poured therein. The water tank 8 with cooling water held therein is then fitted to the top opening 9 of the boiling pot 1. The heater 4 is thereafter energized to start heating and evaporating the heating water W in the boiling pot 1, the steam thus formed surrounding and heating the eggs 2 placed on the egg-supporting structure 3. The steam after having heated the eggs 2 passes upwardly through the suction pipe 13 in the water tank forcing the check valve 18 upward to be ejected to the outside through steam orifices 19 in the cap member 20. This stage of operation continues for a time until the heating water W in the pot has all been evaporated, and then the bottom portion of the boiling pot 1 starts to be heated rapidly. The resulting rapid temperature rise of the pot bottom is made use of to actuate the thermostatic switch 5 to interrupt the energization of the heater.

Upon interruption of the heater current, the steam present in the boiling pot 1 is condensed suddenly to make the pressure therein negative. As a result, the cooling water in the water tank 8 is drawn through the suction port 16 formed in the tubular guide 15 and up through the space 14 between the tubular guide 15 and the suction pipe 13 and then down through the latter into the boiling pot 1. Once the flow of cooling water into the boiling pot has been started, it continues upon the principle of a siphon until all of the cooling water in the water tank 8 has been transferred into the boiling pot to rapidly cool the boiled eggs and the boiling pot itself.

With the automatic electric egg cooker according to the present invention operating as described above, it will be appreciated that when the amount of heating water W in the boiling pot is reduced, the heating circuit is interrupted at an earlier time to soft-boil the eggs, which may be left soft-boiled in the pot without the danger of any heat accumulation occurring to further the coagulation of the egg content. On the other hand, when a larger quantity of heating water is used, the length of heating time is extended accordingly to give harder eggs. It will be understood that with the inventive egg cooker eggs boiled to any desired degree may be obtained with ease by properly selecting the quantity of heating water supplied into the boiling pot. To resume the egg-cooking operation, water and fresh eggs are again placed in the boiling pot and the thermostatic switch is re-closed to energize the heater, whereby the above cycle of operation is repeated to boil the eggs to the desired degree.

Having described the principles of the present invention in conjunction with one embodiment thereof, description will now be made of the detailed construction of the invention illustrating some preferred forms thereof.

Figure 4:
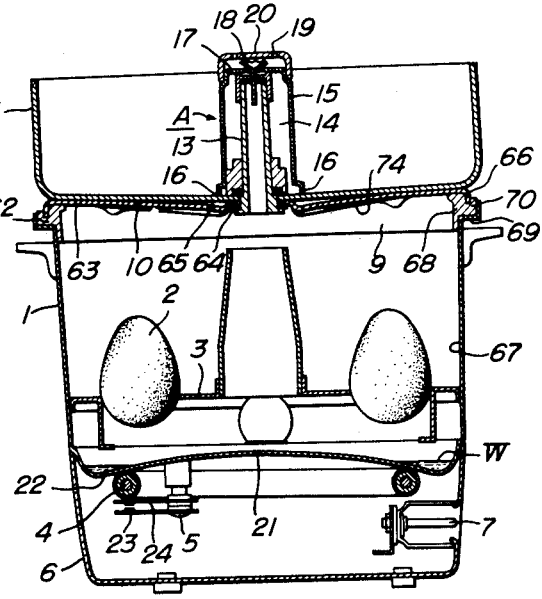
FIG. 4 is a side elevation of another automatic electric egg cooker embodying the present invention.

The boiling pot 1, being designed to accommodate an appropriate number of eggs and a quantity of heating water is preferably formed with a spherically curved bottom 21 as shown in FIG. 4 to withstand a substantially large negative pressure formed in the pot after the eggs have been boiled to the desired degree and the electric current interrupted. By shaping the pot bottom 21 spherically, the boiling pot 1 may be formed of a thin metal sheet while obtaining a sufficient structural strength. In addition, the heater 4 may be fitted to the lowest portion 22 of the spherically shaped pot bottom 21 completely eliminating any danger of scorching the pot since the heating water remains in the lowest bottom portion 22 to the last minute.

The thermostatic switch 5 may take any known form having a fixed contact 23 and a bimetal strip 24 carrying a movable contact, and is mounted beneath the pot bottom preferably with the heat sensing part of the switch 5 positioned adjacent to the heater 4 so as to be fully effective to prevent any scorching of the pot and misoperation of the switch. As will be readily understood, during the time when the boiling pot 1 contains a more or less quantity of heating water, the bottom of the pot cannot be heated to any temperature above a predetermined level even though it is heated by the heater 4 because the heat generated by the heater and transmitted to the pot is dissipated therefrom as the heat of vaporization of the heating water. On the other hand, once the heating water has all been vaporized, the temperature of the pot bottom starts to rise rapidly above the predetermined level. It will be appreciated accordingly that the heater circuit is opened without fail whenever the heating water in the pot has been consumed if only the thermostatic switch 5 arranged as described above is set to operate at and above said predetermined temperature, such temperature setting of the switch being allowed to be made rather roughly. In this manner, the thermostat 5 positioned adjacent to the lowest portion 22 of the pot bottom 21 where the heating water remains to the last minute is operable faithfully in response to the rapid temperature rise of the pot bottom occurring when the heating water therein has exhausted while preventing misoperation of the switch opening the heater circuit prematurely in response to the temperature rise of that portion of the pot bottom which is exposed above the heating water therein. In other words, by disposing the bimetal strip 24 close to the heater 4 mounted on the lowest bottom portion 22, the thermostatic switch may be made operable faithfully at all times in response to the temperature of the pot bottom, eliminating the danger of misoperation of the switch while causing it to respond most quickly to the rapid temperature rise of the pot bottom.

In FIGS. 5a and 5b are shown modified forms of thermostatic switch which operate to open the heater circuit when eggs have been cooked as desired just in the same manner as the thermostatic switch including a bimetal as described above. Referring to FIG. 5a, numeral 25 designates a base member carrying at one end terminals 26 and 27 connected with resilient contact strips 30 and 31 respectively carrying contacts 28 and 29. Insulating washers 32 are provided for insulation between the resilient contact strips 30 and 31 and between the base 25 and the strips. The base 25 has opposite flanges 34 and 35 with a pin 36 bridging the space therebetween to pivotally carry a movable plate 33. The movable plate 33 is bent vertically upwardly at its end adjacent the pivotal connection 37 to form an abutting flange 38.

A coiled spring 39 is arranged about the pin 36 having one end 40 engaging with the abutting flange 38 and the other end 41 restrained by a lug 42 extending from one of the opposite flanges 34 and over the movable plate 33 to urge the latter to rotate about the pivotal connection 37 by way of the abutting flange 38 of the movable plate 33. A stop lug 43 also projects from the flange 34 and over the movable plate 33 to limit the rotation of the latter.

Fitted to the movable plate 33 intermediate its ends is an insulator 44 adapted to depress one of the resilient contact strips 30 to place the contacts 28 and 29 in contact with each other.

A magnet 45 is mounted fast on the movable plate 33 adjacent to its free extremity to cooperate with a magnetic element 46 fixed to an outbent flange 47 formed on the base 25. An operating grip 48 is carried by the movable plate 33 at its free extremity.

The operation and effect of this thermostatic switch will now be described. To close the thermostatic switch, the user is required only to depress the operating grip 48 to lower the free end of the movable plate 33 against the bias of the coiled spring 39 thereby to cause the insulator 44 on the movable plate 33 to deflect the resilient contact strip 30 downwardly to close the contacts 28–29 while enabling the magnet 45 to be held in contact with the magnetic element 46 on the base to hold the contacts 28–29 in closed position.

With the energization of the heater 4, the pot temperature starts to rise and reduce the permeability of the magnetic element 46 and hence its attraction acting upon the magnet 45 until the latter is allowed to separate from the element 46 under the bias of the spring 39 turning the movable plate 33 upwardly about the pivotal connection 37 to abut against the stop lug 43. At the same time, the resilient contact strip 30 is restored under its own resiliency from its deflected position to its normal as the insulator 44 is moved upwardly with the movable plate to open the contacts 28–29.

This thermostatic switch, being constructed as described above is adapted to open automatically when a predetermined temperature is reached, is advantageous in that the operating temperature of the thermostatic switch is readily adjustable with its extremely simplified construction. In other words, the operating temperature of this thermostatic switch is determined simply by the correlation between the variation in the permeability of the magnetic element and the bias of the coiled spring 39 tending to move the magnet away from the magnetic element, and thus is adjustable adjusting the bias of the coiled spring 39 by varying the angle of the abutting flange 38 at which it is bent relative to the general plane of the movable plate 33 and which is normally engaged by the adjacent end 40 of the coiled spring 39. It will be appreciated that this arrangement enables mass production of such thermostatic switch by adjustment of the bending angle of the abutting flange 38 to give a uniform operating temperature allowing more or less variation in characteristic property of the switch components such as magnet 45 and coiled spring 39. In addition, the adjustment can be effected without necessitating dismantling or replacement of such component parts. Among others, the most important advantage of this switch construction is that it requires no special components for its adjustment and thus enables the thermostatic switch to be manufactured at extremely low cost.

A modification of the above described thermostatic switch is illustrated in FIG. 5a. Numeral 201 designates a base member carrying at one end terminals 202 and 203, which are connected with resilient contact strips 206 and 207 carrying respective contacts 204 and 205. Insulating washers 208 are provided for insulation between the resilient contact strips 206 and 207 and between the base 201 and the strips. The base 201 has opposite flanges 210 and 211 with a pin 212 bridging the space therebetween to pivotally carry a movable plate 209. The movable plate 209 is bent vertically upwardly at its end adjacent to the pivotal connection 213 to form an abutting flange 214.

A coiled spring 215 is arranged about the pin 212 having one end 216 engaging with the abutting flange 214 and the other end 217 restrained by a lug 218 extending from one of the opposite flanges 210 of the base and over the movable plate 209 to urge the latter to rotate about the pivotal connection 213 by way of the abutting flange 214 of the movable plate 209. A stop lug 219 also projects from the flange 210 and over the movable plate 209 to limit the rotation thereof under the bias of the coiled spring 215.

Fitted to the movable plate 209 intermediate its ends is a Z-shaped arm 221 carrying at its free end an insulator 220, which is adapted to depress one of the resilient contact strips to close the contacts 204–205. A magnet 222 is mounted fast on the movable plate 209 adjacent to its free extremity to cooperate with a magnetic element 223 fixed to an outbent flange 224 formed on the base 201. An operating grip 225 is carried by the movable plate 209 at its free extremity.

The thermostatic switch constructed as described above operates in a manner different from that in which the thermostatic switch shown in FIG. 5a operates, as described below.

To close the thermostatic switch described and shown in FIG. 5b, the user is required only to depress the operating grip 225 to lower the free end of the moving plate 209 against the bias of the coiled spring 215 thereby to disengage the insulator 220 on the Z-shaped arm 221 secured to the movable plate 209 from the resilient contact strip 206, with which the insulator is normally in engagement under the bias of the coiled spring 215. Upon disengagement of the insulator 220 on the Z-shaped arm 221 from the resilient contact strip 206, the contacts 204–205 are placed in contact with each other since the contact strip 206 is formed of resilient material to normally bias the contacts 204–205 into closed position unless some external force be applied contrarily. Further depression of the operating grip 325 allows the magnet 225 to be attracted against the opposite magnetic element 223 holding the movable plate 219 against restoration to its normal position under the bias of the coiled spring 215 thereby to hold the thermostatic switch in its closed position.

Upon closing of the thermostatic switch, the heater is energized to raise the pot temperature until it reaches a level approximating the Curie point of the material of the magnetic element 223 to reduce the permeability of the latter and therefore the magnetic attraction between the magnet 222 and the magnetic element 223 to such an extent that the bias of the coiled spring 215 exceeds the magnetic attraction. The coiled spring 215 then acts to cause the Z-shaped arm 221 to engage and deflect the resilient contact strip 206 upwardly to open the contacts 204–205.

In this thermostatic switch, the bias of coiled spring 215, the attraction between the magnet and the magnetic element contacting each other, and the resiliency of the contact strip 206 are selected to have the following relationship therebetween: the bias of coiled spring 215 is smaller than the contacting attraction between the magnet and the magnetic element at room temperature and is larger than the resiliency of the contact strip 206. It will be seen that the operating temperature of such thermostatic switch is determined by the bias of the coiled spring and the attraction between the magnet and the magnetic element.

Figure 6:
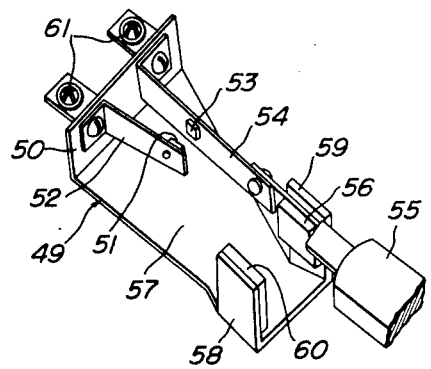
FIG. 6 is a perspective view of another example of thermostatic switch employed in the invention.

FIG. 6 illustrates a further form of thermostatic switch suited for use in the present invention. Numeral 49 designates a base plate formed by bending a single nonmagnetic sheet to have a vertical flange 50, to which are secured a resilient strip 52 carrying a stationary contact 51 and a movable resilient strip 54 carrying a movable contact 53. The movable resilient strip 54 carries at its free extremity a grip 55 and a permanent magnet 56 insulated with respect to the strip. The base plate 49 also has upturned opposite flanges 58 and 59 formed integral with the major or horizontal portion 57 of the base plate with a magnetic element 60 of ferrite secured to one of the upturned flanges 58.

Terminals 61—61 for connection with the heater element of the egg cooker are electrically connected with the resilient strip 52 and the movable resilient strip 54, respectively.

In operation of the thermostatic switch constructed as described above, the grip 55 is laterally displaced against the bias of the movable resilient strip 54 to allow the magnet 56 and the ferrite 60 to be attracted against each other to place the movable contact 53 in contact with the stationary contact 51 for energization of the heater. As the temperature of the bottom of the boiling pot rises to exceed the Curie point of ferrite, the ferrite 60 loses its permeability and therefore its magnetic attraction with respect to the permanent magnet 56 to allow the movable resilient strip 54 to restore its normal position under its own resiliency separating the movable contact 53 thereon from the stationary contact 51 to deenergize the heater.

With the thermostatic switch operable as described above, its operating temperature may readily be controlled by properly selecting the type of the ferrite used and the permanent magnet. It will be readily recognized that this form of thermostatic switch may be set to operate accurately, rapidly and without fail at the operating temperature as set, compared with the form of thermostatic switch employing a bimetal element since, with the former, the ferrite loses its permeability as soon as the temperature exceeds the Curie point of the ferrite.

In addition, it is rather difficult to manufacture bimetallic thermostatic switches having uniform operating characteristics in quantities because the operating temperature of the type of switch is dependent upon such factors as the length of the bimetal and the manner in which it is mounted. To contrast, the magnet type of thermostatic switch described above may be manufactured in quantities with extreme ease to operate at a uniform temperature as long as ferrite having a uniform Curie point is available.

A further advantage of this type of thermostatic switch is that it enables the user to sense its switch-in operation without fail since it is closed by the magnetic attraction.

It will be recognized that the foregoing advantages may be realized by an extremely simplified construction of the various forms of thermostatic switch as described hereinbefore.

Though a few examples of automatic electric egg cooker equipped with a thermostatic switch employing a bimetal or a ferrite magnet have been described, it will be understood that an automatic electric egg cooker having the same functional effect may also be provided by employing a timer switch in place of the thermostatic switch as a means for deenergizing the heater when the eggs have been cooked to the desired degree. Where a thermostatic switch is employed, the egg cooker is set to boil eggs to a desired hardness by properly determining the quantity of heating water to be filled in the boiling pot, as described above. To contrast, where a timer switch is employed, the length of heating time is properly selected to obtain eggs boiled to the desired hardness while employing a predetermined quantity of heating water.

In more detail, eggs boiled to any desired hardness may also be obtained easily by use of a timer switch incorporated in the heater circuit of the egg cooker, for instance by properly selecting the setting of the timer switch. Only, in this case, the quantity of heating water used in the boiling pot and the working range of the timer switch should be correlated so as to ensure that any scorching of the boling pot is prevented even when the timer switch is set to the maximum heating time or the upper limit of its working range and that, when the minimum heating time or the lower limit of the timer range is selected, steam is generated at least in a quantity enough to soft-boil the raw eggs. To operate this egg cooker, the user is only required to load eggs and pour a predetermined quantity of heating water into the boiling pot, then close the heating circuit and finally setting the timer switch to boil the eggs to the desired hardness.

Incidentally, the cooling of boiled eggs with cooling water is performed quite in the same manner as with the case of the egg cooker employing a thermostatic switch as described hereinbefore.

The water tank 8 will now be described in further detail. The water tank 8, being fitted to the top opening 9 of the boiling pot 1, is in sealing contact with the packing 62 arranged along the peripheral edge of the top opening 9 under the weight of the tank itself to keep the interior of the boiling pot 1 airtight.

The arrangement of the water tank 8 on top of the boiling pot 1 is advantageous in that it allows the cooling water to be efficiently poured into the boiling pot to effectively cool the eggs boiled to the desired degree. However, the arrangement of the water tank 8 on top of the boiling pot 1 is not essential for the functioning of the egg cooling means. For example, the water tank 8 may be mounted on the side wall or the lower portion of the pot 1.

In this case, though the pouring of water into the boiling pot may not be effected so efficiently as with the case in which the tank is arranged on top of the boiling pot, the cooling water in the tank is effectively withdrawn into the pot under the negative pressure formed therein, performing quite the same egg cooling action as when the tank is arranged on top of the pot.

The heat-shielding plate 10, being secured to the underside of the water tank 8, is effective to thermally insulate the cooling water in the water tank 8 from the boiling pot 1. As best seen in FIGS. 7a and 7b, the heat-shielding plate 10 is secured to the bottom of the water tank 8 with its peripheral edge portion 63 and central portion 64 directly in contact with the outer surface of the tank bottom, the remaining region of the plate 10 being spaced from the tank bottom for thermal insulation therefrom as indicated at 65. The space 65 forms an insulation layer effective to prevent the heat in the boiling pot 1 from being transferred to the water tank 8 and the cooling water therein.

The heat shielding plate 10 may be spherically curved to further ensure that the plate fully withstands the negative pressure or vacuum formed in the boiling pot 1.

Furthermore, the heat-shielding plate 10 is formed around the periphery thereof with a depending flange 66, which is in line contact with the packing 62 arranged along the periphery of the top opening 9 of the boiling pot 1. In fact, the depending flange 66 bites into the packing 62 to form a perfect fluid-tight seal with respect to the boiling pot 1. The packing 62 itself is shaped as clearly shown in FIGS. 3 and 7.

To detail the packing 62, it includes an inner wall portion 68 adapted to engage the inner wall surface 67 of the boiling pot 1 and the inside of the depending flange 66 of the heat-shielding plate 10 and an outer wall portion 70 formed to fit in a shouldered portion 69 formed on the boiling pot 1 around the top opening 9 thereof. The inner and outer wall portions 68 and 70 defines an annular groove 71 for receiving the depending flange 66 of the heat-shielding plate 10. The length of that portion of the inner packing wally 68 extending between the top 72 thereof and the bottom 73 of the groove 71 is larger than the vertical length of the depending flange 66. Therefore, when the water tank 8 has no water therein, the heat-shielding plate 10 is in close contact with the packing 62 only along the top 72 of the inner wall portion 68 thereof, the depending flange 66 not closely engaging the bottom 73 of the groove 71 formed in the packing 62, as shown in FIG. 7a. On the other hand, when filled with water W', the water tank 8 descends because of the weight of the water W therein as shown in FIG. 7b so that the bottom surface 74 of the heat-shielding plate 10 is pressed forcibly against the top 72 of the inner packing wall portion 68 forming a fluid-tight seal therebetween as the inner wall portion 68, which is flexible, is deformed under the weight of the water tank 8 and the water W' held therein. At the same time the depending flange 66 of the heat-shielding plate 10 is forced into the bottom 73 of the groove 71 formed in the packing 62 to establish a tight contact therewith.

It is to be noted that the packing ring 62 is adapted to form a fluid-tight seal between the top 72 of the inner packing wall portion 68 and the bottom surface 74 of the heat-shielding plate 10 and between the depending flange 66 of the heat-shielding plate 10 and the bottom of the groove 71 formed in the packing 62, and thus has a double sealing effect enabling the packing to function satisfactorily even if there exist some causes possibly affecting the function of the packing, such as flaws or cuts in the bottom surface 74 or the depending flange 66 of the heat-shielding plate 10. The above described configuration of the packing 62 makes it easy to keep the interior of the boiling pot 1 fluid-tight, as will readily be appreciated.

The heat-shielding plate 10 is formed around its center with a shouldered portion 75 to define said space 65 for thermal insulation between the boiling pot and the water tank. The shouldered portion 75 functions as follows.

The steam formed during the egg cooking adheres to the heat-shielding plate 10 for condensation, the condensate flowing along the bottom surface of the plate 10 to the outer periphery of the shouldered portion 75 to fall into the boiling pot 1 as relatively large water drops. Thus, the shouldered portion 75 of the heat-shielding plate 10 is effective to prevent any water drops to proceed beyond the shouldered portion toward the central opening 12 of the plate 10. In other words, the shouldered portion 75 functions as a water deflector thereby to prevent any condensate from being lifted with steam through the suction pipe 13 to raise the temperature of the cooling water.

Figure 8:
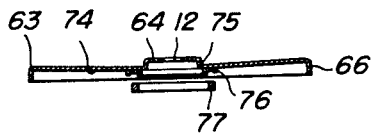
FIG. 8 is a side elevation of a modified heat-shielding plate.

In addition, as shown in FIG. 8, an annular barrier element 76 of U-section may be secured to the peripheral edge of the through opening 12 in the heat-shielding plate 10 for detachably receiving a piece of sponge 77 or other water-absorbing material serving for the same purpose as said shouldered portion 75. This arrangement also serves to hold water drops therein effectively preventing the water drops from falling into the boiling pot 1 after the eggs have been boiled and before the cooling water is poured into the boiling pot, that is, while the pot has no heating water therein.

The purpose of preventing water drops from falling into the boiling pot 1 after the eggs have been boiled and the boiling pot emptied of water is as follows. If any water drop adhering to the heat-shielding plate 10 fall into the boiling pot 1 when the pot is at an elevated temperature after the heating water therein has been removed, the water drop will be explosively vaporized and may blow up the check valve 18 to dislocate it or surprise the user. Such possibilities are effectively eliminated by arranging the sponge 77 as described above.

Figure 3B:
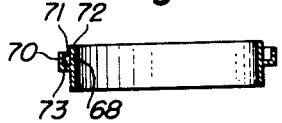

Furthermore, a radial array of ribs 78 may be formed on the heat-shielding plate 10 as shown in FIG. 3 for strengthening the plate 10 to make it withstandable to any large negative pressure more effectively than the curved formation of the plate as described hereinbefore.

Description will now be made in detail on the water sucking device A for pouring the cooling water from the water tank 8 into the boiling pot 1.

As shown in FIG. 9, the suction pipe 13 is formed close to the bottom opening with a flange 79 and a threaded portion 80. In assembling the suction pipe 13, it is fitted to the heat-shielding plate 10 by inserting it upwardly into the through aperture 12 therein and further into the central through opening 11 in the bottom of the water tank 8 to engage a lower packing 81 on the suction pipe 13 with the bottom 74 of heat-shielding plate 10. An upper packing 82, a metal ring and a threaded nut 84 are fitted over the suction pipe as shown, and the threaded nut is threaded on said threaded portion 80 of the suction pipe to tightly clamp the upper packing 82 and metal ring 83 to the tank bottom. In assemblage, as seen in FIG. 1, the suction pipe 13 extends through the through openings 11 and 12 formed in the water tank and the heat-shielding plate, respectively, with the upper and lower packings 81 and 82 positioned in engagement with the outer bottom surface 74 of the heat-shielding plate 10 and the inner bottom surface of the water tank 8, respectively, the threaded nut 84 being fitted to the threaded pipe portion 80 extending upwardly beyond the through opening 11 to clamp together the suction pipe 13, water tank 8 and heat-shielding plate 10 in fluid-tight relation into an integral unit. The purpose of interposing metal ring 83 between the upper packing 82 and the threaded nut 84 is to prevent the upper packing 82 from being turned with the nut 84 when the latter is tightened.

The through openings 11 and 12 and the portions of the suction pipe 13 fitting in said respective openings are preferably formed other than circular, for example square, for preventing the three components including water tank 8, heat-shielding plate 10 and suction pipe 13 from turning relative to one another.

The threaded nut 84 is formed with a plurality of water passageways 85 in the periphery thereof. The threaded nut is also threaded about the periphery thereof to receive the guide tube 15. Thus the guide tube 15 is adapted to be detachably threaded over the externally threaded nut 84. The guide tube 15 may of course be formed simply to fit over the nut correspondingly formed. The suction pipe 13 carries a guide plate 86 and a rubber cap 87 (FIG. 9). The rubber cap 87 is engageable with the underside of the top 17 of the guide tube 15 in fluid-tight relation to prevent any water from being withdrawn through the top opening of the suction pipe 13 while serving as a cushion when the guide tube 15 is fitted over the suction pipe 13. The passage of water into the suction pipe 13 is effected through suction slots 88 formed in the wall of the suction pipe 13 adjacent to its top.

The water sucking device A operates as follows. When the eggs in the boiling pot 1 have been boiled as desired and the pressure in the pot is reduced to negative, the cooling water in the water tank 8 is continuously drawn through the suction ports 16 in the guide tube and the water passageways 85 in the threaded nut 84 to rise through the space 14 between the guide tube 15 and the suction pipe 15 and through the suction slots 88 formed in the top of the suction pipe 15 into the latter to be poured into the boiling pot 1 for cooling the eggs and the pot itself.

The size of the suction slots 88 is important as it determines the rate of flow of cooling water into the boiling pot 1. If any excessive quantity of cooling water be poured into the boiling pot 1 with a rush, the inner pressure of the boiled eggs would be suddenly reduced and the shells would possibly be cracked to allow the egg content to burst out detracting from the taste thereof. On the contrary, if the rate of flow of cooling water be excessively low, the egg cooling would be delayed to further the coagulation of the egg content. In either case, it would be impossible to obtain eggs boiled to the desired degree with any improper rate of flow of cooling water into the boiling pot.

Accordingly, the suction slots 88 should be sized so that the cooling water is drawn in a quantity such that no shells of the boiled eggs are cracked and that the coagulation of the egg content is kept from being furthered as when the egg cooling be delayed. For example, the suction slots 88 are sized to allow about one litre of cooling water to pass therethrough in approximately 20 to 50 seconds. Though in this form the suction slots 88 are designed for metering the cooling water as described, it will be understood that the suction ports 16 at the bottom of the guide tube may alternatively be utilized for the same metering purpose as illustrated in FIG. 10.

In this suction device, the suction pipe 13 having an open top end, the suction ports 16 at the bottom end of the guide tube are arranged and dimensioned so as to provide an appropriate rate of suction as with the above described suction arrangement including slots 88 in the top of the suction pipe 13.

In order that the entire cooling water in the water tank 8 may be drawn out, the suction ports 16 should be disposed at the lowest bottom portion of the water tank 8 centrally thereof. For this purpose, the central portion of the tank bottom is depressed and inclined downwardly toward the axis of the water tank as shown with the suction ports 16 provided along the lowest area of such inclined central bottom portion.

The suction pipe 13 shown in FIG. 10 is also distinguished from that shown in FIG. 1 in that it has a double wall structure including an inner pipe 89 and an outer pipe 91 secured thereto in spaced relation as indicated at 90. It will be understood that the space 90 defined between the inner and outer pipes forms an insulating layer of air effective to prevent the cooling water in the water tank 8 from being heated by hot steam when the latter passes from the boiling pot 1 upwardly through the inner pipe 89 to be ejected exteriorly through the check valve 18 arranged at the top of the guide tube.

Another modification of the water sucking device is shown in FIG. 11. This modification includes a single pipe 92 bent in siphon fashion or in inverted U-shape and secured at the bottom end 93 to communicate with the interior of the boiling pot 1 with the other end 94 located to be immersed in cooling water when the water tank is filled therewith, a check valve 18 being fitted to the upper side of the top bent portion of the pipe 92. It is evident that this form of sucking device also serves for the same purpose as effectively as the forms of water sucking device previously described.

Though these forms of water sucking device as well as that shown in FIG. 11 are based upon the principle of a siphon for their operation, it is to be understood that any suitable mechanical device may also be employed for the purpose of pouring cooling water into the boiling pot if desired. For example, the water tank may simply be formed at its bottom with an opening which is adapted to be held closed during the time when the boiling pot is heated and be opened automatically for example by a suitable solenoid valve operable upon the opening of the heater circuit when eggs have been cooked to the desired degree.

Description will now be made on the steam ejection device on the automatic electric egg cooker. A cap member 20 is detachably fitted or threaded to the top of the guide tube 15 to enclose check valve 18 mounted on the top surface thereof as described hereinbefore and as shown in FIG. 1. The provision of the cap member 20 facilitates maintenance operation as when any unexpected trouble occurs with the check valve 18 since the latter may readily be made accessible for repair simply by removing the cap member 20. The cap member 20 also serves to prevent any dislocation of the check valve from its normal position.

Steam orifices 19 are formed in the top wall of the cap member 20 opposite to the top opening 95 of the guide tube 15, and preferably in position such that the flow of steam being ejected is virtually not hampered. For example, the steam orifices 19 are formed in the top wall of the cap member 20 in alignment with the top peripheral edge of the check valve 18.

Such streamlining of the flow of steam being ejected is important for the purpose of preventing the steam from being directed into the space 14 between the suction pipe 13 and the guide tube 15. The cooling water in the space 14 would be heated by the steam unless it flows smoothly through the steam outlet opening 95 and the steam orifices 19 to the exterior. If the cooling water in the space 14 be heated, the cooling water outside of the space 14 would also be heated impairing the function of cooling boiled eggs.

Generally, where the cooling water is drawn by the siphon action utilizing a negative pressure occurring in the boiling pot, it is important that the steam be ejected smoothly.

The check valve 18 will now be described in further detail. As shown in FIG. 12, the check valve 18 includes a cup 97 formed along its top peripheral edge with a number of spaced notches 96, a guide rod 99 secured to the bottom of cup 97 and having an annular ridge 98, and a complementarily shaped outer cover 100 fitted outside of the cup 97 and formed of rubber. The annular ridge 98 on the guide rod 99 serves to hold the rubber cover 100 fitted over the cup 97 against falling off, while the notches 96 formed in the top peripheral edge of the cup 97 are effective to prevent the check valve 18 from adhesively engaging with the top wall of the cap member 20 due to the surface tension effect of the water. Without the provision of notches 96 or the equivalent, the interior of the cup would be sealed fluid-tight if the cup 97 with some water or other fluid adhering thereto be brought into contact with the underside of the top wall of the cap member 20. The cup-like formation of the check valve also serves to position the center of gravity thereof below the steam outlet opening 95 thereby to enable the check valve to automatically be restored to its normal position whenever it be misaligned relative to the steam outlet opening 95.

An extremely simplified form of check valve is illustrated in FIG. 13, which includes a rubber disc 101 and a guide rod 102 secured thereto. It will be understood that the check valve may take any form as long as it allows the steam formed in the boiling pot 1 to be ejected smoothly to the exterior while keeping the ambient air from entering the boiling pot 1. With the form of check valve including rubber disc 101 and guide rod 102, it is necessary to provide means for preventing the check valve from being dislocated, from its normal position. For example, the cap member 20 may be formed with a downwardly extending protuberance 103 on the underside of the top wall thereof, as shown in FIG. 14, or the rubber disc 101 of the check valve may be formed with an upwardly extending protuberance 103a, either of the protuberances 103, 103a being effective to limit the lift of the check valve thereby preventing it from being misaligned or dislocated from its normal position.

It is desirable to provide a signalling means to indicate that the eggs have been boiled to the desired degree. For example, as shown in FIGS. 16a and 16b a whistle 104 may be mounted on top of the cap member 20 so as to be sounded by the jet of steam therethrough. The whistle stops to sound when the steam formation comes to an end, informing the user of the fact that the eggs have been boiled to a predetermined degree and the cooling water starts to be poured into the boiling pot.

The whistle is generally tubular and is formed with a sounding aperture 105. The whistle is mounted inclined on top of the cap member 20 with the sounding aperture 105 located adjacent to one of the steam orifices 19 in the top wall of the cap member 20, as shown in FIGS. 16a and 16b. Provided at the lower end of the inclined whistle 104 is a drain hole 106 for draining any condensate formed in the whistle 104 to the outside.

Figure 17A:
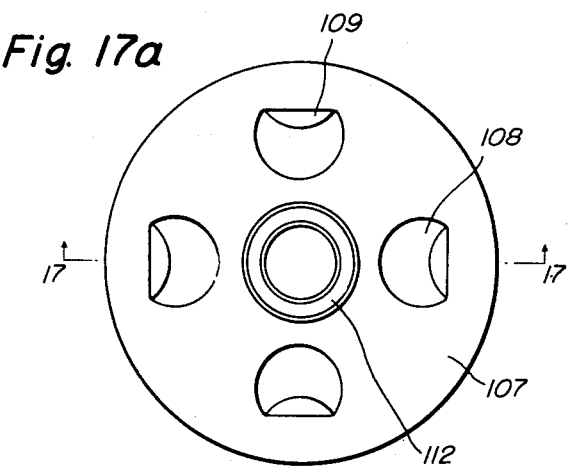
FIG. 17a shows one form of egg-supporting structure in top plan.

Description will now be made in detail on the egg supporting structure 3, particularly with reference to FIG. 17.

Numeral 107 denotes a steaming disc made, for example, of sheet metal and cut to form a number of egg apertures 108 for supporting eggs one for each. The cut pieces 109 are each bent down to form a pedestal of the egg supporting structure 3. The height H of each of the pedestals 109 is determined so as to exceed the vertical extent or length L of that portion of the egg received in the respective aperture 108 which projects downwardly from the level of the steaming plate 107. The steaming plate 107 is reinforced by forming a downwardly extending peripheral flange 111. A tubular hand grip 112 is fitted securely in an opening formed in the steaming plate 107 centrally thereof.

The egg supporting structure of the automatic electric egg cooker is adapted to be placed in the boiling pot of the egg cooker with eggs received in the respective egg apertures formed in the steaming plate of the structure and, after the eggs have been cooked as desired, is taken out of the cooker and placed on the table. Eggs are variable in size and shape. Smaller or more slender eggs when received in the egg apertures in the steaming plate project downwardly therefrom to a greater extent while, with larger or thicker eggs, the extent of such downward projection is limited. The egg supporting structure, therefore, must be dimensioned upon the basis of the expected extent of downward projection of the eggs to be boiled so that the eggs may not be damaged by engagement with the table top when the egg supporting structure is placed thereon.

Figure 17B:
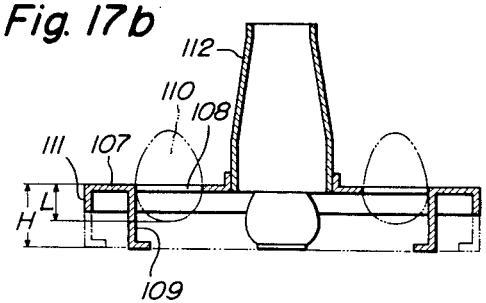

In the past, the egg receiving apertures have been cut out in the steaming plate by stamping with the peripheral portion of the steaming plate bent downward to form a pedestal therefor, as shown in FIG. 17b in dotted lines. Such egg supporting structure has required extra area of metal sheet for the pedestal formation involving an excessive material cost. On the other hand, according to the present invention, portions of the steaming plate 107 is cut to form integral pieces each joined along one side thereof with the body portion of the steaming plate forming apertures 108 therein for receiving eggs, the integral pieces being utilized to form respective pedestals 109 of the egg-supporting structure. With this construction cut areas of the metal sheet which have previously been wasted are made use of to form pedestals without any loss of material. It will be appreciated that, with the egg-supporting structure of the present invention, the steaming plate 107 may have the same overall area as before with lesser material therefor and thus is more economical. The peripheral edge of the steaming plate 107 bent downwardly to form an annular flange 111 of limited width is for the purpose of stiffening the steaming plates 107 as indicated hereinbefore.

Figure 18:
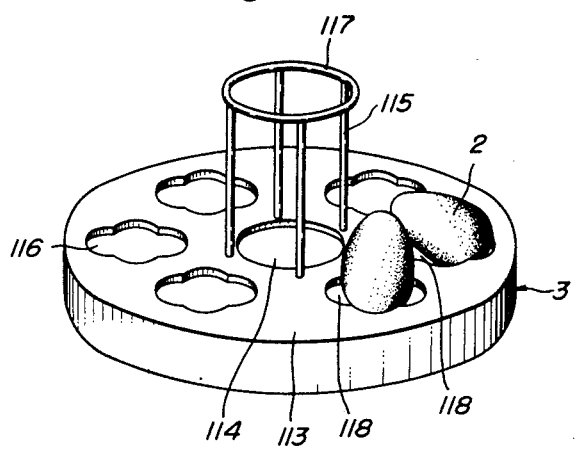
FIG. 18 is a perspective view of another form of egg-supporting structure.

FIG. 18 illustrates a modified form of egg-supporting structure, which includes a steaming plate 113 formed so as to be fittingly received in the boiling pot 1 and a number of support rods 115 rising from the peripheral edge of an opening 114 formed in the plate centrally thereof. The steaming plate 113 is formed with spaced egg-receiving apertures 116 each defined by a combination of elliptical and circular arcs. A ring 119 may be secured to the support rods at the top thereof for convenience in carrying the egg-supporting structure. The particular configuration of each of the egg-receiving apertures 116 enables eggs to be placed stable in any position (for example upright or recumbent) with spaces left open between the egg and the edge of the egg-receiving aperture 116 as indicated at 118 in FIG. 18. The spaces serve as a passage for steam formed in the bottom of the boiling pot 1 allowing the steam to rise to the upper side of the steaming plate 113 to surround the eggs thereon thereby ensuring that the interior of the boiling pot 1 is filled up with steam to uniformly heat eggs therein.

Also, it is noted that this egg-supporting structure may be accommodated in the water tank 8 with the water sucking device A fitted in the through opening 114 formed in the steaming plate. Accordingly, the egg-supporting structure may be carried with the water tank serving as a kind of carrying tray therefor eliminating any danger occurring because of the instability of the egg-supporting structure when carried separately.

Figure 19:
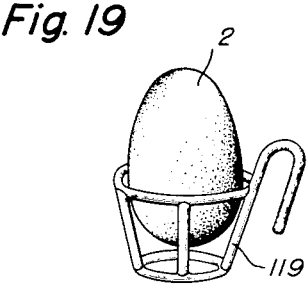
FIG. 19 is a perspective view showing an egg holder adapted to hold a single egg.

FIG. 19 illustrates an egg cage 119 adapted to carry a single egg and be fitted in any of egg-receiving apertures 108. On this occasion, boiled eggs may be served at the table together with such egg cages.

Figure 20:
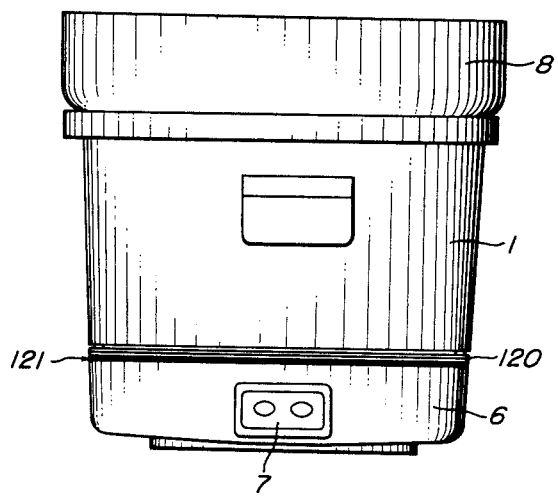
FIG. 20 is a side elevation of the automatic electric egg cooker as equipped with a heat dissipator plate for improving the heat dissipation effect.

As a further improvement, the electric egg cooker according to the present invention may be provided with a heat-dissipating device 121 comprising a plurality of heat-dissipating plates 120 laminated in spaced relation with each other and positioned between the boiling pot 1 and the skirt 6 as shown in FIG. 20. This arrangement is effective to prevent heat transmission to the skirt 6 allowing the user to place the automatic electric egg cooker on any desired place.

It will be understood that the present invention is not limited to the embodiments described but various changes and modifications may be made thereto without departing from the spirit and scope of the invention as defined in the appended claims.

What is claimed is:

1. An automatic electric egg cooker comprising a boiling pot adapted for holding a supply of heating water and eggs and having a spherically-shaped bottom wall, electric heater means at the lowest portion of said bottom wall of said boiling pot; a thermostatic switch including a magnet, a magnetic element, electric contacts arranged to open and close upon engagement and disengagement of said magnet and said magnetic element and a resilient element operable to separate and disengage said magnet and said magnetic element from each other, said thermostatic switch being operable to control said heater means in response to the temperature of the bottom of the pot which rapidly rises upon vaporization of all said supply of heating water, a water tank detachably secured to the top opening of said boiling pot to accommodate a supply of cooling water for cooling the boiled eggs, a heat-shielding plate interposed between said boiling pot and said water tank with a heat-insulating space defined therebetween and covering the top opening of said boiling pot in gas-tight sealing relation, means for introducing a supply of cooling water into said boiling pot by utilization of a partial vacuum formed in said boiling pot as the result of the dissipation of steam from said boiling pot when said heating water therein is heated and said boiling pot cools down after the operation of said thermostatic switch to disconnect the heater circuit upon complete vaporization of said supply of heating water, said means for introducing cooling water including a suction pipe extending through said water tank and said heat-shielding plate axially thereof and having one opening exposed in the interior of said boiling pot and a guide tube having a suction port at the bottom and a check valve at the top, said guide tube being assembled over said suction pipe with a space defined therebetween for passage of cooling water, said heat-shielding plate including in a zone spaced from said opening of said suction pipe combined draining and reinforcing ribs for dripping water condensate formed in said heat-shielding plate as a result of the steam in said boiling pot.

2. An automatic electric egg cooker comprising a boiling pot adapted for holding a supply of heating water and eggs and having a spherically-shaped bottom wall, electric heater means at the lowest portion of the bottom wall of said boiling pot, a thermostatic switch including a magnet, a magnetic element, electric contacts arranged to open and close upon engagement and disengagement of said magnet and said magnetic element and a resilient element operable to disengage said magnet and said magnetic element from each other, said thermostatic switch being operable to control said heater means in response to the temperature of the bottom of the pot which rapidly rises upon complete vaporization of said heating water, a water tank detachably secured to the top opening of said boiling pot to accommodate a supply of cooling water for cooling the boiled eggs, a heat-shielding plate interposed between said boiling pot and said water tank with a heat-insulating space defined therebetween and covering the opening of said boiling pot in gas-tight sealing relation, and means for introducing a supply of cooling water into said boiling pot by utilization of a partial vacuum formed in said boiling pot as the result of the dissipation of steam from said boiling pot when said supply of heating water therein is heated and said boiling pot cools down after the operation of said thermostatic switch to disconnect the heater circuit upon complete vaporization of said supply of heating water, said means for introducing cooling water including a suction pipe extending in a through aperture provided in the bottom of said water tank centrally thereof, a threaded nut securing said suction pipe to said bottom, a guide tube threadably fitted to said threaded nut and provided with a water passage while cooperating with said suction pipe to define a cooling water passageway, suction slots being provided in the top portion of said suction pipe to limit the flow of cooling water into said boiling pot, a rubber cap for closing the top opening of said suction pipe, a check valve fitted to the top of said guide tube, and a cap member covering said check valve and including a protuberance for limiting the range of travel of said check valve, said heat-shielding plate including in a zone spaced from the inlet port of said suction pipe combined draining and reinforcing ribs for dripping water condensate formed on said heat-shielding plate as a result of the steam in said boiling pot.

3. An automatic electric egg cooker comprising a boiling pot adapted for holding a supply of heating water and eggs and having a spherically-shaped bottom wall, electric heater means at the lowest portion of the bottom wall of said boiling pot, thermostatic switch means operable to control said heater means in response to the temperature of the bottom wall of said boiling pot which rapidly rises upon complete vaporization of said supply of heating water, a water tank detachably secured to the top opening of said boiling pot to accommodate a supply of cooling water for cooling the boiled eggs, a heat-shielding plate interposed between said boiling pot and said water tank with a heat-insulating space defined therebetween and covering the opening of said boiling pot in gas-tight sealing relation, and means for introducing a supply of cooling water into said boiling pot by utilization of a partial vacuum formed in said boiling pot as the result of the dissipation of steam from said boiling pot when said supply of heating water therein is heated and said boiling pot cools down after the operation of said thermostatic switch to disconnect the heater circuit upon complete vaporization of said supply of heating water, said means for introducing cooling water including a suction pipe extending through said water tank and said heat-shielding plate axially of said water tank and having one opening exposed in the interior of said boiling pot and a guide tube having a suction port at the bottom and a check valve at the top, said guide tube being assembled over said suction pipe and defining a space therebetween for passage of the cooling water, said heat-shielding plate including in a zone spaced from said opening of said suction pipe combined draining and reinforcing ribs for dripping water condensate formed on said heat-shielding plate as a result of steam in said boiling pot, said thermostatic switch means including two resilient strips carrying cooperating electric contacts, a magnetic element for sensing the temperature of the pot bottom which rapidly rises upon complete vaporization of said supply of heating water, a magnet operable to attract and release said magnetic element, a movable strip carrying said magnet and pivotally secured at one end for pivotal movement, a spring biasing said movable strip in a direction away from said magnetic element and an insulating member operable upon movement of said movable strip to actuate one of said resilient strips to open said electric contacts.

4. An automatic electric egg cooker comprising a boiling pot adapted for holding a supply of heating water and eggs and having a spherically-shaped bottom wall, electric heater means at the lowest portion of said bottom wall of said boiling pot, a thermostatic switch including a magnet, a magnetic element, electric contacts arranged to open and close upon engagement and disengagement of said magnet and magnetic element and a resilient element separating said magnet and magnetic element from each other, said thermostatic switch being operable to control said heater means in response to the temperature of the bottom of the pot which rapidly rises upon complete vaporizaton of said supply of heating water, a water tank detachably secured to the top opening of said boiling pot to accommodate a supply of cooling water for cooling the boiled eggs, a heat-shielding plate interposed between said boiling pot and said water tank with a heat-insulating space defined therebetween and covering the top opening of said boiling pot, a packing element of resilient material having an outer wall portion adapted to fit in a shouldered portion formed about the periphery of the top opening of said boiling pot and an inner wall portion adapted to engage the adjacent side of a depending flange formed about the outer periphrey of said heat-shielding plate with a groove defined between said outer and inner wall portions and having a depth larger than the vertical extent of the depending peripheral edge of said heat-shielding plate, and means for introducing a supply of cooling water into said boiling pot by utilization of a partial vacuum formed in said boiling pot as the result of the dissipation of steam from said boiling pot when said supply of heating water therein is heated and the boiling pot is cooled down after the operation of said thermostatic switch to disconnect the heater circuit upon complete vaporization of said supply of heating water, said means for introducing water including a suction pipe extending through said water tank and said heat-shielding plate axially of said water tank and having one opening exposed in the interior of said pot and a guide tube having a suction port at the bottom and a check valve at the top, said guide tube being assembled over said suction pipe defining a space therebetween for passage of the cooling water, said heat-shielding plate including in a zone spaced from said opening of said suction pipe combined draining and reinforcing ribs for dripping water condensate formed on said heat-shielding plate as a result of the steam in said boiling pot.

References Cited in the file of this patent

UNITED STATES PATENTS

| | | |
|---|---|---|
| 1,230,845 | Blake | June 26, 1917 |
| 2,518,566 | Osterheld | Aug. 15, 1950 |
| 2,624,266 | Colburn et al. | Jan. 6, 1953 |
| 2,741,975 | Kueser | Apr. 17, 1956 |
| 2,761,375 | Jepson | Sept. 4, 1956 |

FOREIGN PATENTS

| | | |
|---|---|---|
| 19,220 | Great Britain | Sept. 12, 1908 |
| 175,917 | Germany | Oct. 10, 1906 |
| 208,931 | Germany | Oct. 25, 1908 |